F. SEYMOUR.
FURNACE AND THE PROCESS OF COMBUSTION OF PULVERULENT AND OTHER FUEL, ADAPTED FOR STEAM BOILERS.
APPLICATION FILED JAN. 6, 1919.

1,355,172.

Patented Oct. 12, 1920.
7 SHEETS—SHEET 1.

Fig. 1.

INVENTOR
BY
ATTORNEY

F. SEYMOUR.
FURNACE AND THE PROCESS OF COMBUSTION OF PULVERULENT AND OTHER FUEL,
ADAPTED FOR STEAM BOILERS.
APPLICATION FILED JAN. 6, 1919.

1,355,172.

Patented Oct. 12, 1920.
7 SHEETS—SHEET 2.

INVENTOR

BY

ATTORNEY

F. SEYMOUR.
FURNACE AND THE PROCESS OF COMBUSTION OF PULVERULENT AND OTHER FUEL,
ADAPTED FOR STEAM BOILERS.
APPLICATION FILED JAN. 6, 1919.

1,355,172.

Patented Oct. 12, 1920.

INVENTOR

BY

ATTORNEY

F. SEYMOUR.
FURNACE AND THE PROCESS OF COMBUSTION OF PULVERULENT AND OTHER FUEL,
ADAPTED FOR STEAM BOILERS.
APPLICATION FILED JAN. 6, 1919.

1,355,172.

Patented Oct. 12, 1920.
7 SHEETS—SHEET 4.

INVENTOR

BY

ATTORNEY

F. SEYMOUR.
FURNACE AND THE PROCESS OF COMBUSTION OF PULVERULENT AND OTHER FUEL,
ADAPTED FOR STEAM BOILERS.
APPLICATION FILED JAN. 6, 1919.

1,355,172.

Patented Oct. 12, 1920.
7 SHEETS—SHEET 5.

INVENTOR
BY
ATTORNEY

F. SEYMOUR.
FURNACE AND THE PROCESS OF COMBUSTION OF PULVERULENT AND OTHER FUEL,
ADAPTED FOR STEAM BOILERS.
APPLICATION FILED JAN. 6, 1919.

1,355,172.

Patented Oct. 12, 1920.

INVENTOR,
BY
ATTORNEY

F. SEYMOUR.
FURNACE AND THE PROCESS OF COMBUSTION OF PULVERULENT AND OTHER FUEL,
ADAPTED FOR STEAM BOILERS.
APPLICATION FILED JAN. 6, 1919.

1,355,172.

Patented Oct. 12, 1920.

INVENTOR

BY

ATTORNEY

UNITED STATES PATENT OFFICE.

FREDERICK SEYMOUR, OF EAST ORANGE, NEW JERSEY.

FURNACE AND THE PROCESS OF COMBUSTION OF PULVERULENT AND OTHER FUEL, ADAPTED FOR STEAM-BOILERS.

1,355,172.  Specification of Letters Patent.  Patented Oct. 12, 1920.

Application filed January 6, 1919. Serial No. 269,926.

*To all whom it may concern:*

Be it known that I, FREDERICK SEYMOUR, a citizen of the United States, residing at East Orange, in the county of Essex and State of New Jersey, have invented a new and useful Furnace and the Processes of Combustion of Pulverulent and Other Fuel, adapted for steam-boilers.

My invention relates to the continuous generating and utilizing of the heat from the combustion of pulverulent and other fuel in suspension in air and to the means of preventing the destruction and clogging of the furnace.

The objects of my invention are:—

1st: To provide a process and an apparatus in which it may be practised, which will continuously utilize the high temperature of the perfect combustion of powdered fuel burned in suspension in air, will effect complete combustion of the maximum amount of fuel in the shortest possible time and in the minimum of space, will not require lowering the attainable temperature by excess air, will not melt down the furnace, and will not choke the furnace with the refractory products of liquid ash, thereby making the process practical and continuous and the furnace efficient, durable, and of available size and dimensions.

2nd: To provide a process and apparatus that will eliminate every destructive step and feature, the necessity for excess air, the choking of the furnace with the refractory products of liquid ash, the melting down of the furnace wall, and will permit maximum temperatures and fuel consumption in suspension in air in restricted space with a minimum of loss by radiation thus coördinating all the steps of the process and all the elements of the furnace for mutual reaction and for making a successful and durable furnace and an efficient process for burning powdered fuel.

3rd: To provide durable walls and where required a durable roof for the furnace, and prevent the fluxing action of the bricks with the ash.

4th: To provide means for mixing the air with the pulverulent coal, as well as with the volatile combustibles, after ignition, and for effective complete combustion without substantial excess air.

5th: To provide a durable and efficient furnace of low cost, for burning in pulverulent form in suspension in air all grades of coal and lignite without smoke.

Other objects will appear from the hereinafter description.

My improved treatment of liquid ash begins with the roof and side walls of the combustion chamber and ends with the cooled atmosphere of the ash pit. The means that keep down temperature of the roof and side walls preserves the roof and side walls themselves, and like means cool the liquid ash and render it manageable. The construction and the means that prevent the ash from running down into the ash pit with sufficient mobility to form on cooling a solid glassy and flinty bed, that cannot be removed except by blasting and by tearing the furnace down, are like the construction and means employed to prevent the side walls and the roof of the furnace from melting down, which otherwise would occur in the first day of full working to capacity.

Thus, my improvements are unitary in character, and go to a unitary result, they have one origin the high temperature, and I provide one means of preventing the destruction of the furnace, namely the protection of every refractory surface over which the liquid ash moves, by utilizing locally for the generation of steam so much and only so much of the heat of combustion after the temperature reaches the destructive point as will suffice for the purpose of protection at the point where the heat is so utilized, and by the same or like means I cool the atmosphere of the ash pit through which the molten ash drips. I provide a furnace that will stand up indefinitely, and will utilize to the full the heat of combustion of powdered fuel burned in suspension in the minimum of air, without carrying unburned carbon up the flues and therefore with high efficiency. My one object is to utilize heat, not merely to burn coal, that may be done in any furnace for a few hours, with waste and destruction. I make use of the great difference in the rate of transmission of heat through the refractory lining of the combustion chamber on the one hand and through water cooled metal on the other, in such a way as to maintain in the combustion chamber an atmosphere of a temperature almost the maximum attainable with pulverized coal burned in suspension with the theoretical requirement of air, so high that the ash in the combustion chamber is liquid, first as a fine spray, then in contact with the lining taking the form of a thin liquid film of low conductivity.

It is well known that the most economical and efficient use of coal is in powdered form, burned in suspension in air; but when carried on at the rate most efficient for steam generation, the combustion is so energetic, almost explosive, and the temperature produced is so high, that liquid ash is precipitated and the brick work of the furnace is melted down in a few days or usually in a few hours. On a slight decrease in temperature, the liquid ash thus precipitated becomes plastic and on further decrease in temperature, becomes hard, refractory, of a glassy appearance, and in either case adheres to the setting and is difficult to remove. If a considerable quantity of excess air is used in the process of combustion, the temperature is so lowered that the ash, when precipitated, is plastic and viscous, will not flow and adheres to the brick work and is also difficult to remove. If still further excess air is used in the process of combustion, a part of the ash is precipitated in form of powder, which may be readily removed, but the rate of combustion is reduced, the efficiency of the furnace for steam generation is also reduced and there is required for burning a given quantity of coal a combustion chamber of large dimensions, which oftentimes makes it impracticable to use pulverized coal in steam generating plants, where space is restricted.

The aforesaid varying conditions resulting from carrying on combustion of powdered coal are influenced not only by the varying temperatures of the atmosphere in which combustion takes place, but also by the varying temperatures at which the ash will fuse, and these temperatures vary with different coals as much as 500° F.

With pulverized coal it is essential that the chemical union of the carbon of the coal and the oxygen of the air should be finished before the gases pass into or among the tubes of the boiler, for the temperature is there almost immediately reduced to a point which retards or arrests combustion.

In burning pulverized coal, time and temperature are reciprocal terms, to the extent that, if the temperature of the atmosphere in which combustion is carried on is high, less time is required to finish combustion, and if such temperature is low, the rate of combustion is reduced and the time required to finish combustion is extended.

My process and the furnace in which it is carried on are devised to accelerate the rate of combustion by carrying on the process in an atmosphere of high temperature which is easily attainable with pulverized coal, and thus to reduce the time between the ignition of the fuel and the completion of combustion, and during that time preventing the unconsumed fuel from coming in contact with the boiler tubes.

To solve this problem, I have observed and participated in tests which carried out a destructive process, and then broke down, and such a furnace, in which such a process is carried out, is practically useless, except for research work and scientific experiment.

Other difficulties arise such as the want of thorough mixture of the powder with the air in which it is suspended, and even after ignition the tendency is for the solid elements, the volatile combustible, and the air to move in parallel lines, retarding the rate of combustion, and a re-mixture of these elements in the combustion chamber is desired, and for this purpose I prefer to introduce the powdered fuel and the air in which it is suspended in two or more blasts, which impinge one upon the other in the furnace, preferably after ignition has begun, and where there is room the blasts may impinge head on, and in other cases at an angle, and good results are obtained by having the blasts meet not quite centrally, but one slightly above or at the side of the other, so as to give a reverberatory motion of the combined blasts within the combustion chamber.

Since the high temperatures resulting from the combustion of pulverulent coal in suspension in the theoretical requirement of air, liquefy the ash, it is necessary to dispose of the liquid ash before its temperature is reduced to the point at which it becomes plastic, viscous or solid in the bed. I therefore substitute for the grate, in an ordinary lump coal burning chamber, water tubes or a water leg which may extend the whole width and length of the fire chamber, except for the slot hereafter mentioned, but may be much narrower and shorter, the tubes when used spaced rather close together from the sides toward the center, but at the center or at any other convenient place two of these water tubes are spaced farther apart, and when water legs are employed a space is left between them so as to make a slot, and the tubes or the horizontal part of the water legs as the case may be are covered with firebrick, or other refractory material, providing an edge of refractory material for the opening, over which the liquid ash will pass and drip to the ash-pit below, and in dripping, the globules will be partially solidified by the cooler air of the ash-pit so that they will not agglomerate. Farther away from the opening, the bottom water-tubes are placed close enough together to support cinders and ashes or other refractory material, or lump coal, which may at first be flat, but which, in use by accumulation of ash, may become inclined toward the opening down which inclines the liquid ash will run and drip through the opening.

In lieu of the fire-brick on the edge of the slot, any refractory material may be used, or the liquid ash may be allowed to accumulate by solidification on the water cooled surface next the slot, until thick enough to permit any additional liquid ash to drip into the ash-pit and yet not clog the slot.

The described construction between the combustion chamber and the ash pit shelters the ash pit from the greater part of the heat of the combustion chamber, provides a water cooled metal surface over the ash pit which keeps the temperature of the ash pit atmosphere far below the fusing point of the ash and at the same time furnishes moderate heating surface for the generation of steam.

If the ash-pit be deep, say five feet or more from the water-tubes supporting the bottom of the combustion chamber, and forming the top of the ash-pit, there may be substituted any other support, except it will always be found advantageous to have a water-cooled surface adjacent to each side of the slot opening.

I protect the walls and roof of the combustion chamber from the destructive heat and from the liquid ash by embedding water tubes therein, or engaging them thereon, or they may be wholly exposed and not at all embedded in the walls, and the number of tubes should be reduced and the spaces between them enlarged the more they are exposed. I find it preferable, however, to have these protecting tubes wholly covered with brick work or tiles, and lying within two or three inches from the inner surfaces of the combustion chamber. These water-tubes, as well as the tubes supporting the bottom of the combustion chamber preferably participate in the water circulation of the boiler, but may have an independent circulation.

I have described the preferable form of water protection to the furnace lining but other forms may be used, such as a water leg back of the lining and in contact therewith, and an exposed water leg may be used at the rear end of the combustion chamber or elsewhere provided they are so located that unconsumed fuel does not contact with them.

So also the shell of a horizontal return tubular boiler seldom less than sixteen feet long may be exposed its full length to the gases while the process of combustion is going on under it, and if the walls of the combustion chamber are protected as herein described it is practicable to maintain without destructive results a temperature sufficiently high to complete combustion before the gases reach the rear of the boiler and enter the tubes.

Fine pulverizing and thorough mixture of the air with the pulverulent coal are indispensable conditions of fuel economy and efficiency, and I therefore preferably pulverize the coal in a pulverizer, which mingles the pulverulent coal with a regulable amount of air in the process of pulverizing, and delivers the mixture of coal and air to the furnace before there occurs any separation of the mixture, and to commingle still further these elements and the volatiles, I cause the blasts within the combustion chamber to impinge on each other.

Preferably, I pulverize the coal as used, and do not store it, thus avoiding caking of the pulverulent coal by storage and a second handling, dispensing with the necessity of artificially drying the coal, and preventing explosions from floating dust particles, and I shut down the furnace by shutting down the pulverizer or shutting off the feed to the pulverizer, but my invention may be used with any system for pulverizing and feeding the coal which delivers the coal to the furnace in suspension on a current of air.

I illustrate my improved furnace in the accompanying drawings, forming part of this specification, in which, by way of illustration only, and not as a limitation, I describe it as applied to a water tube boiler of the Heine type and to a water tube boiler of the Babcock & Wilcox type and to a fire tube boiler of the locomotive type and to a horizontal return tubular boiler, it being understood that my improved combustion chamber with the ordinary adaptations of size and heat currents may be coupled without further experiment or invention to any other boiler or furnace, by changes within the scope of those skilled in the art.

My furnace may be built into the boiler setting as part thereof or may be wholly or partially outside such setting.

Similar letters refer to similar parts throughout.

A, is the combustion chamber preferably made about fifty per cent. larger in cubic contents than the combustion chamber in a furnace for burning an equal amount of lump coal upon grates.

B, is the lining of the combustion chamber, composed of refractory material in which are embedded water-tubes $b$ or it is in contact with a water cooled metal surface $b'$.

Figure 1:
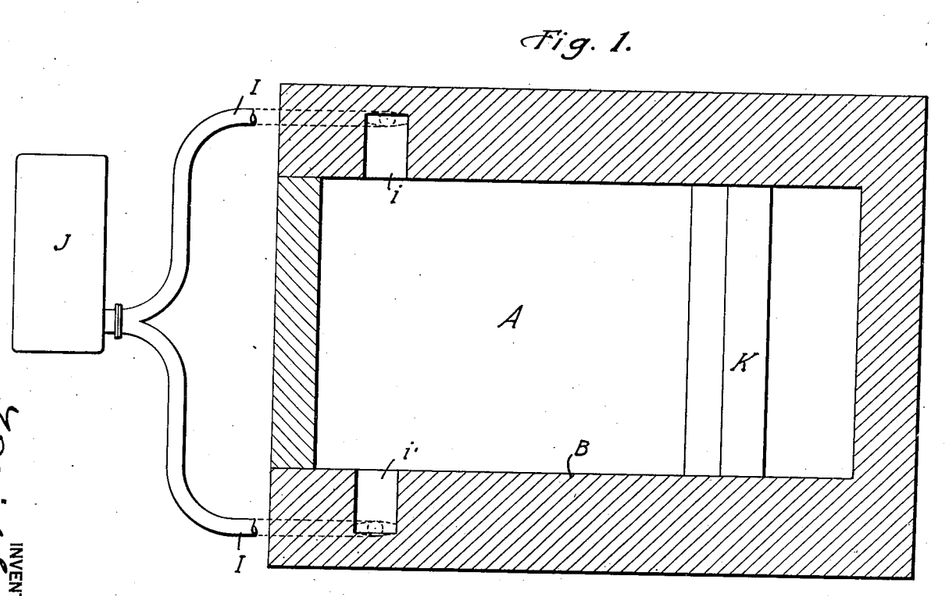
Figure 1 is a plan of the combustion chamber, showing in diagrammatic form the coal pulverizer, the leads therefrom branching to both sides of the combustion chamber, supplying to the combustion chamber the pulverulent coal borne on air currents, preferably in due proportion for perfect combustion.
Figure 2:
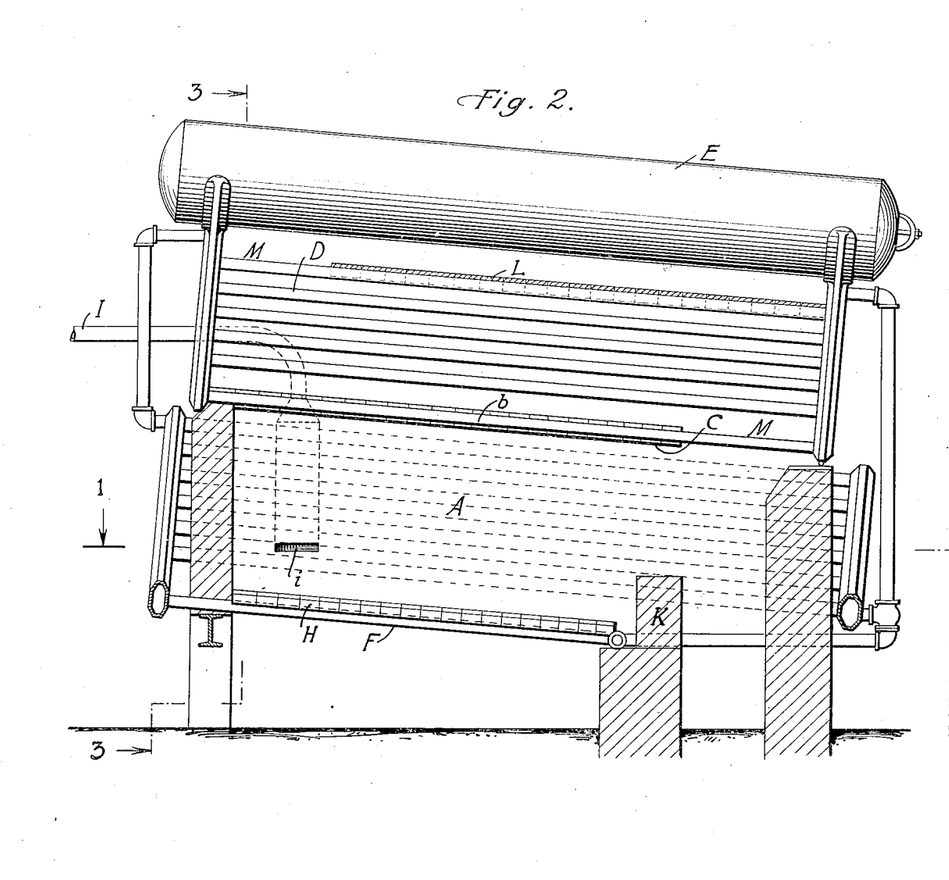
Fig. 2 is a longitudinal vertical section of a boiler of the Heine type, the combustion chamber, leads, and their twyers, and a part of the leads from the pulverizer.
Figure 3:
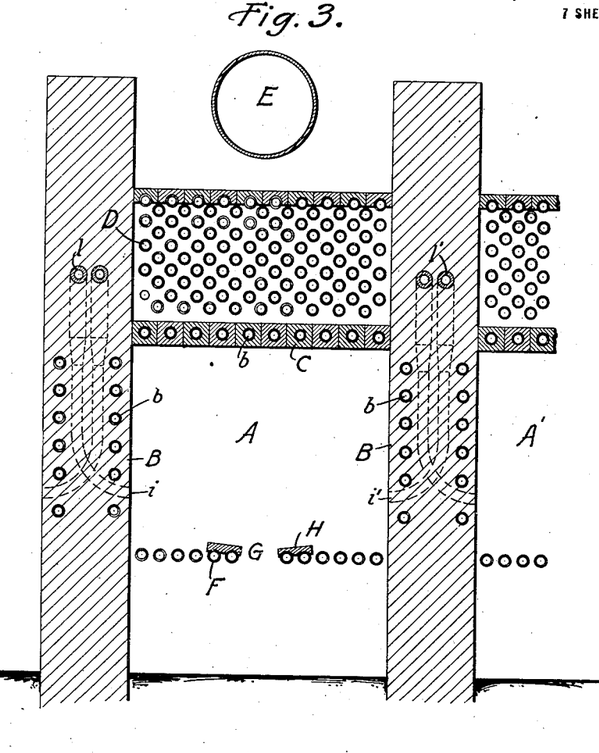
Fig. 3 is a vertical cross-section of a boiler of the Heine type, the combustion chamber, ash-pit opening for the passage of liquid ash, the edges of which are shown to be made of fire-brick, supported by water-tubes, the masonry showing embedded water-tubes on the sides, the twyers of the leads to the fire chamber from the pulverizer, and showing the partition wall between two boilers of a nest of boilers embodying this invention, and showing two leads embedded therein, one for the chamber A, and the other for the adjacent chamber A'. The leads to the adjacent chambers would be omitted in installations for a single boiler.
Figure 4:
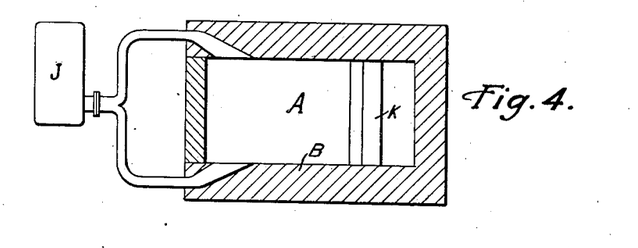
Fig. 4 is a plan view of a portion of the combustion chamber with a modified position of the leads from the pulverizer and the twyers, showing the air currents bearing pulverulent coal impinging at an angle.
Figure 5:
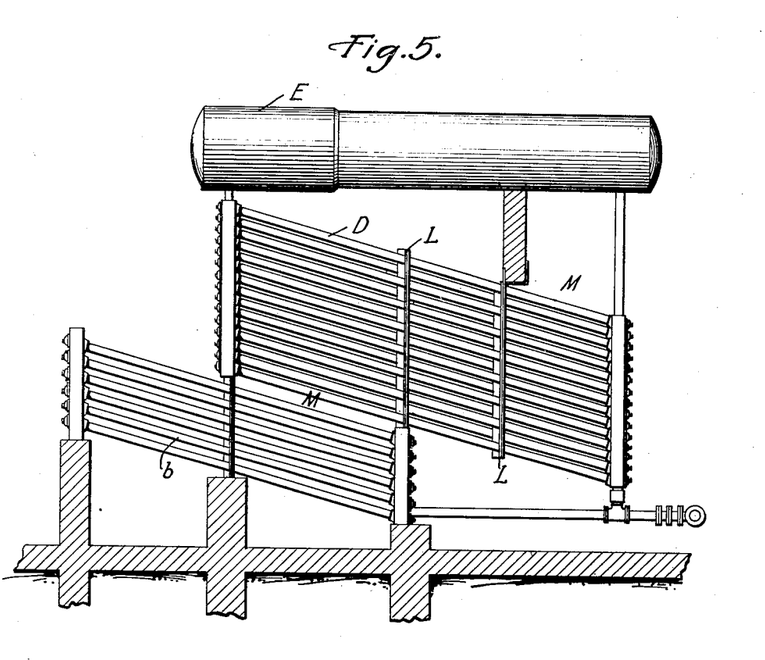
Fig. 5 shows a longitudinal, vertical view of the water tubes for the sides of the combustion chamber, partly within and partly without the setting of a boiler of the Babcock & Wilcox type, with a box water leg at the front and rear of the combustion chamber.
Figure 6:
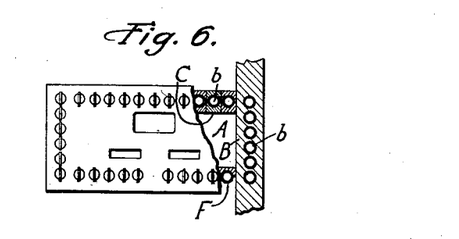
Fig. 6 shows a front elevation of the water leg at the front and rear of the combustion chamber indicated in Fig. 5, partly broken away to show the refractory covering of the tubes.
Figure 7:
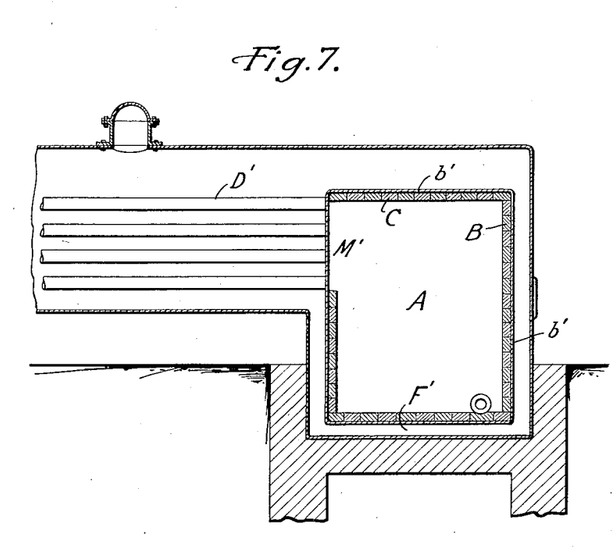
Fig. 7 shows a longitudinal, vertical section of a furnace in which the refractory lining is backed by water legs, as applied to a boiler of the locomotive type.
Figure 8:
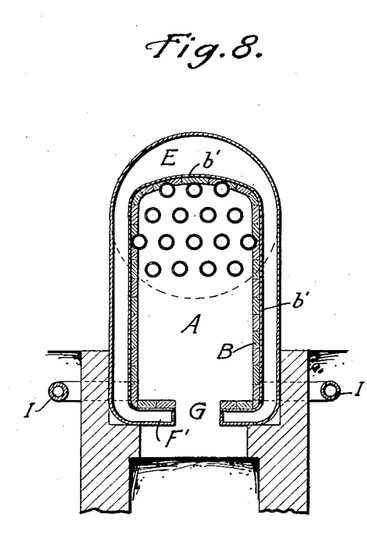
Fig. 8 shows a vertical cross section of the furnace shown in Fig. 7.
Figure 9:
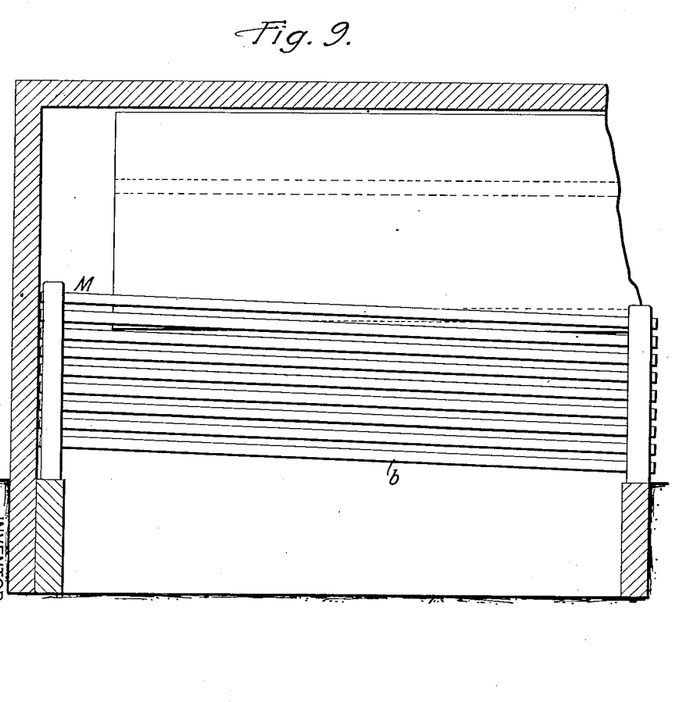
Fig. 9 is a vertical, longitudinal view of a horizontal return tubular boiler with protecting water tubes in the side walls and a water leg at either end.
Figure 10:
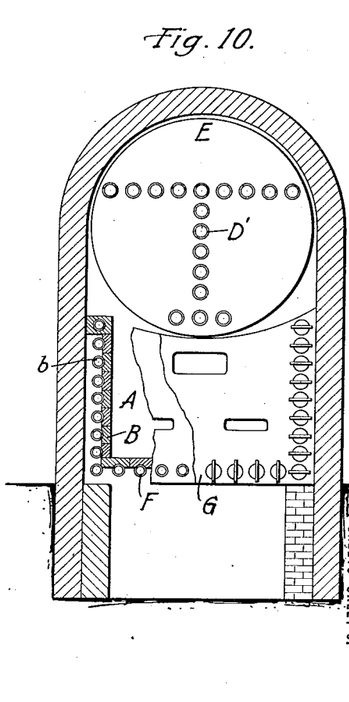
Fig. 10 shows a front elevation of Fig. 9, with the front water leg partly cut away showing hand holes in the front plate and the ends of tubes expanded into the back plate and exposing to view the ends of tubes in the side walls and under the combustion chamber.
Figure 11:
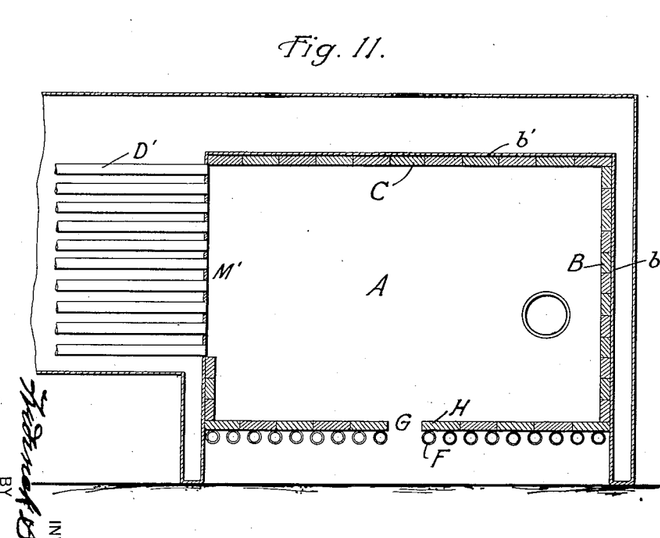
Fig. 11 is a vertical longitudinal section of a boiler of the locomotive type and a combustion chamber wherein the sides and top are lined with brick against water cooled surfaces and the bottom of the combustion chamber is supported by water cooled tubes.
Figure 12:
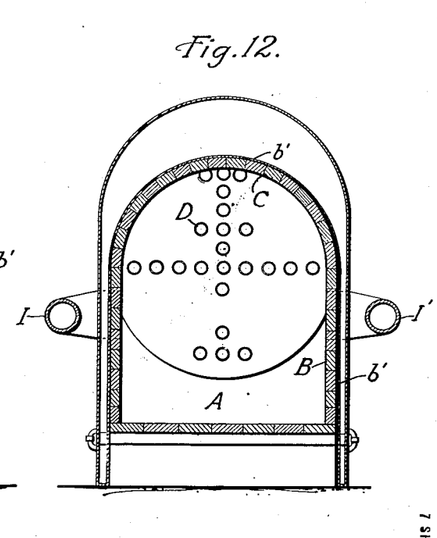
Fig. 12 is a cross section of Fig. 11.

C, is the crown of the combustion chamber, composed of fire-brick or other refractory material, inclosing water-tubes $b$, or in contact with water cooled surfaces $b'$ near the inner surface thereof. This crown may be partly or wholly omitted in certain forms of furnace such as that shown in Figs. 9 and 10.

The water tubes $b$ and the water cooled metal surfaces $b'$ are in the water circulation system of the boiler, and serve also to preserve the fire-brick composing the inner walls of the combustion chamber A.

D, represents the ordinary water tubes of the boiler, and D' the fire tubes of a boiler.

E, is the water and steam drum.

F, represents water tubes, and F' water legs also in the water circulation system of the boiler, or in the feed water system, or having independent circulation which supports the bottom of the combustion chamber, and serves to cool the ash-pit. These parts are arranged to form an opening G for the discharge of liquid ash preferably twelve to fourteen inches wide, and the tubes nearest the opening are shown overlaid with a line of fire-bricks H, or with other refractory material.

I and I', are leads for currents of air bearing pulverulent coal from the pulverizer J, and $i$ and $i^x$ are the twyers.

J, is the pulverizer, shown in diagrammatic form, and may be of any type desired or the coal may be pulverized at a central station, conveyed to a bin near the furnace and thence fed to the furnace by any of the well known feeding devices which mix the coal with air, not much in excess of the volume for perfect combustion, say about ten per cent. of excess air.

K, is a bridge wall, and may be omitted or made much lower than in grate furnaces.

L, is a fire-brick baffle tiling for directing the flue gases through the boiler.

M, represents openings in the crown of the combustion chamber and in the fire-brick baffle tiling for the passage of flue gases. M', shows an opening in the refractory lining of a boiler of locomotive type for like purpose.

While I have shown my invention in connection with a steam boiler, it may be used for a variety of other purposes.

*Operation.*

The operation of my improved furnace is as follows:—

The water tubes F, and the water leg F' supporting the bottom of the combustion chamber on both sides of the opening G, are covered with fire-brick or with cinders and ashes, or the like, and a temporary fire of wood, or other combustible, is started thereon, and when the fire is well under way, the pulverizer J, or other mechanism used in lieu thereof for feeding the coal is set in motion by any usual means, not shown, from which pulverulent coal, preferably soft coal commingled with air, preferably in the proportion of about thirteen of air to one of combustible by weight, is carried well mixed in the leads I and I' to the combustion chamber A, and there from the opposite twyers $i$ and $i'$, the blasts meet in the combustion chamber, and, by the preliminary fire therein, the pulverulent coal is ignited in suspension in air. Intimate commingling of the pulverulent coal and of the volatiles with the air is further effected by the impingement of the two blasts one upon the other, and by the indirect course thereby given to the gases, and the whole volume rolls on to the rear of the furnace, and to the orifice M or M' for entering the water tube or fire tube space. Throughout this transit, combustion is very energetic, and, notwithstanding the great increase in the volume of the gases, the dimensions of the furnace, and the time of transit are such that combustion will be complete within the combustion chamber, and whatsoever enters the tube space through the orifice from the combustion chamber, are high temperature gases without solid burning particles of coal, and without unburned volatile combustibles, otherwise the much lower temperature of the tubes, even in a boiler in full action, seldom over 400° F., would cool any particles that might still be borne by the gases of combustion and arrest combustion thereof, so that these unburned particles would in some part of the current of flue gases fall down and their combustion be arrested, or be carried up the flues unburned.

The proper mixture of coal and air may at first be determined by analysis of the flue gases and the adjustment of coal and air is so made that the analysis shows no carbon monoxid and but a trace of oxygen. Roughly, it may also be determined by so adjusting the feed of coal and air as to produce a dazzling white flame within the furnace with no smoke escaping from the stack.

The operator having adjusted his feed of coal and air, so as to show no CO, and only a trace of O, in the flue gases, and so as to produce no smoke, and having observed the color and character of the flame in the furnace under such conditions, will thereafter make no substantial error in regulating the relative amounts of coal and air by the observed condition of the flame, coupled with an absence of any emission of smoke from the stack.

No combustion chamber can be adjusted once for all for all variations of fuel as to volatile combustibles, ash and moisture, nor for all conditions of atmosphere as to temperature and moisture, or for variable loads; and, accordingly, to meet such varying conditions the feeding mechanism, from time to time, should be so adjusted that the required coal and air are delivered to the furnace. It is not desirable to admit a substantial amount of air to the furnace through the ash-pit, and if air should be so admitted, it should be limited to an amount, which will not cause the liquid ash to solidify on the edge of the opening G in quantity sufficient to close the same. It is preferable to employ only such pulverizers or feeding mechanism as are capable of delivering a volume of air with the coal sufficient for complete combustion at maximum load. It is advantageous so to regulate the stack damper as to produce in the furnace a neutral pressure, or even a slight back pressure.

It is obvious that my improved process and apparatus is adapted to burn not only pulverulent solid fuel but also atomized liquid fuel in suspension in air, and gases commingled with air or either of them or all or any of them combined.

I may vary the size and shape of the combustion chamber, the location of the refractories, the relative location of the water channels or water tubes and the refractories, the size and the number of tubes introducing the blast, the size and shape of the pass between the combustion chamber and the boiler, the location and size of the slotted bottom, the location of the furnace whether horizontal as described or upright or inclined as it may be, and may make other changes without departing from the spirit of my invention, it being understood that my invention is a furnace which lends itself readily to connection with existing boilers, sometimes by adapting the furnace already associated with existing boilers to my requirements or building a new furnace wholly or partly outside of an existing boiler and introducing the products of combustion from my improved furnace directly to the boilers or indirectly through an existing furnace changed or unchanged, and I may in original construction associate my furnace with any form of boiler using some of the steam surfaces of the boiler for the boundaries of my furnace or combustion chamber.

For the best results there is a rough proportion between the capacity of the furnace and the volume and velocity of the blast, and if a blast must carry 2000 pounds of coal an hour for example, the volume of the blast must be sufficient to carry also the air requisite for complete combustion without deficiency and preferably without excess air and must be introduced in velocity sufficient to carry the fuel in suspension through time and space enough for substantially complete combustion within the combustion chamber and must not be so swift as to carry unburned fuel in among the water tubes or fire tubes.

What I claim as new and desire to secure by Letters Patent is:—

1. In a furnace, the combination of a combustion chamber, an inlet admitting a blast of fuel and air in desired proportions, an outlet for the gaseous products of combustion, a water-cooled liquid-ash opening so formed and disposed as to discharge liquid ash without agglomeration except in lumps, a water-cooled ash pit covered except as to the liquid-ash opening, said combustion chamber being formed to cause the fuel and air to move progressively and in the final stages toward said outlet, but not to pass through said outlet until combustion within the chamber is substantially complete, boundaries of said combustion chamber, the most and preferably all of which comprise refractory materials, the sides preferably vertical, water-cooling means associated with refractory materials, maintaining the body of refractories at incandescence but at a temperature below the fusing temperature thereof and causing and permitting in the combustion chamber approximately the maximum combustion temperature, all adapted to burn the fuel in maximum quantity, in minimum time, in suspension in air, completely before substantially any particles thereof contact with heat absorbing means beyond the combustion chamber.

2. In a furnace, the combination of a combustion chamber, an inlet admitting a blast of fuel and air in desired proportions, an outlet for the gaseous products of combustion, said combustion chamber being formed to cause the fuel and air to move progressively and in the final stages toward said outlet but not to pass through said outlet until combustion within the chamber is substantially complete, boundaries of said combustion chamber, the most and preferably all of which comprise refractory materials, water pipes associated with refractory materials, maintaining the body of refractories at incandescence but at a temperature below the fusing temperature thereof and causing and permitting in the combustion chamber approximately the maximum combustion temperature, all adapted to burn the fuel in maximum quantity, in minimum time, in suspension in air, completely before substantially any particles thereof contact with heat absorbing means beyond the combustion chamber.

3. In a furnace, the combination of a combustion chamber, an inlet admitting a blast of fuel and air in desired proportions, an outlet for the gaseous products of combustion, a water-cooled liquid ash opening so formed and disposed as to discharge liquid ash without agglomeration except in lumps, a water-cooled ash pit covered except as to the liquid-ash opening, said combustion chamber being formed to cause the fuel and air to move progressively and in the final stages toward said outlet but not to pass through said outlet until combustion within the chamber is substantially complete, boundaries of said combustion chamber, the most and preferably all of which comprise refractory materials, water pipes associated with refractory materials maintaining the body of refractories at incandescence but at a temperature below the fusing temperature thereof and causing and permitting in the combustion chamber approximately the maximum combustion temperature, all adapted to burn the fuel in maximum quantity, in minimum time, in suspension in air, completely before substantially any particles thereof contact with heat absorbing means beyond the combustion chamber.

4. In a furnace, the combination of a combustion chamber, an inlet admitting a blast of fuel and air in desired proportions, an outlet for the gaseous products of combustion, said combustion chamber being formed to cause the fuel and air to move progressively and in the final stages toward said outlet but not to pass through said outlet until combustion within the chamber is substantially complete, boundaries of said combustion chamber, the most and preferably all of which comprise refractory materials, construction cooling means maintaining the body of refractories at incandescence but at a temperature below the fusing temperature thereof and causing and permitting in the combustion chamber approximately the maximum combustion temperature, all adapted to burn the fuel in maximum quantity, in minimum time, in suspension in air, completely before substantially any particles thereof contact with heat absorbing means beyond the combustion chamber.

5. In a furnace adapted to burn to capacity pulverulent solid fuel in suspension in air, in a blast, a combustion chamber of a size approximately adequate to accommodate and contain the fuel and air wherein combustion takes place until combustion is substantially complete in the combustion chamber, an outlet for the products of combustion and hot gases, means for admitting the fuel laden blast to the combustion chamber, a water-cooled slotted bottom and an ash pit underneath.

6. A furnace adapted to burn fuel in air commingled in desired proportions, in a blast, a combustion chamber comprising in its construction refractory material associated with water-cooling means, an inlet for admitting the blast, an outlet for the products of combustion and the hot gases, and means for maintaining the internal air pressure of the furnace above atmospheric pressure.

7. In a furnace, the combination of a combustion chamber, an ash pit thereunder, an inlet to the combustion chamber for the admission of a mixture of fuel and air, an outlet for the gaseous products of combustion, an open passage to the ash pit through the bottom of the combustion chamber, the area of said passage being of such dimensions and so disposed that molten ash flowing from the combustion chamber into the ash pit over any side of said passage will not contact in the passage with that flowing over the opposite side, the major part and preferably all boundaries to the combustion chamber consisting of refractory material, water-cooled metal adjacent to the major part and preferably to all refractory boundaries, water-cooled metal adjacent to the edges of the said passage to the ash pit, exposed water-cooled metal in the ash pit preferably at the top thereof.

8. In a furnace, the combination of a combustion chamber, a water-cooled ash pit, an inlet to the combustion chamber for admitting a mixture of fuel and air, an outlet for the gaseous products of combustion, an open water-cooled passage to the ash pit through the bottom of the combustion chamber of such dimensions and so disposed that liquid ash flowing into the ash pit over any side of said passage will not contact with that flowing over the opposite side, the major part and preferably all boundaries of the combustion chamber comprising refractory material, water-cooled metal adjacent to the major part and preferably to all refractory boundaries, exposed water-cooled metal in the ash pit preferably at the top.

9. In a furnace adapted to burn fuel in air commingled in desired proportions, in suspension, in a blast, a combustion chamber of which the side walls and preferably the top are constructed of refractory material, reinforced with water cooling pipes, and a water-cooled ash discharge.

10. In a furnace adapted to burn fuel in air commingled in desired proportions, in suspension, in a blast, a combustion chamber of which the side walls and preferably the top are constructed of refractory material, reinforced with water cooling pipes, adapted alone to maintain the same below the fusing temperature but at incandescence.

11. The continuous process of generating in a furnace and utilizing heat in making steam which consists 1st:—In introducing into a furnace commingled fuel and air substantially in proportion for complete combustion, without substantial excess or deficiency of air, in a blast;

2nd:—In maintaining refractories at incandescence but below the fusing temperature thereof and igniting the incoming combustibles by the incandescent refractories and the already burning combustibles and maintaining in the zone of combustion approximately the maximum combustion temperature;

3rd:—In burning combustibles in suspension in air, commingled with air, mainly within the combustion chamber, completely before the products of combustion contact with steam generating means beyond the combustion chamber, and when but not before combustion is substantially complete in the combustion chamber passing the products of combustion and the hot gases onward to the boiler;

4th:—In concurrently heating water at boundaries of the combustion chamber and adjacent to incandescent refractories;

5th:—And in cooling at the discharge the liquid ash thereby causing it to leave the furnace without agglomeration except in lumps.

12. The continuous process of generating in a furnace and utilizing heat in making steam which consists 1st:—In introducing into a furnace commingled fuel and air substantially in proportion for complete combustion without substantial excess of deficiency of air in a blast;

2nd:—In maintaining refractories at incandescence but below the fusing temperature thereof and igniting the incoming combustibles by the incandescent refractories and the already burning combustibles, maintaining in the zone of combustion approximately the maximum combustion temperature;

3rd:—In burning combustibles in suspension in air, commingled with air, mainly within the combustion chamber, completely before the products of combustion contact with steam generating surfaces beyond the combustion chamber, and when but not before combustion is substantially complete in the combustion chamber, passing the products of combustion and the hot gases onward to the boiler;

4th:—In concurrently heating water at boundaries of the combustion chamber and adjacent to incandescent refractories.

13. The continuous process of generating heat in a furnace and utilizing heat which consists 1st:—In igniting combustibles in suspension in air commingled with air by incandescent refractories, and already burning combustibles and burning them in suspension in air mainly within the combustion chamber, completely before the products of combustion contact with steam generating surfaces beyond the combustion chamber;

2nd:—In protecting the parts of the combustion chamber where composed of refractories from destruction by fusing by causing refractories to heat water in water ways adjacent thereto but not extensively exposed within the combustion chamber, without the requirement of other cooling.

14. The continuous process of generating heat in a furnace and utilizing heat which consists;
1st:—In burning pulverulent fuel in suspension in air in a combustion chamber;
2nd:—And in cooling the liquid ash at the discharge and causing it to leave the combustion chamber without agglomeration except in lumps.

15. The continuous process of generating heat in a furnace and utilizing heat which consists In introducing into a zone of combustion a blast of commingled fuel and air in desired proportions, giving to the commingled fuel and air while in combustion and their products a progressive motion which in the final stage is in the direction of the outlet from the zone of combustion, confining the fuel and air during the combustion process by boundaries comprising refractories until combustion of the fuel is substantially complete, maintaining by construction means the refractories at incandescence but at a temperature below the fusing point thereof; and maintaining in the furnace the internal air pressure above atmospheric pressure.

In witness whereof I have hereunto set my hand at the borough of Manhattan, city and State of New York, this 4th day of January, 1919.

FRED'K SEYMOUR.

In presence of—
C. CURTIS,
JOHN J. RANAGAN.